(No Model.) 2 Sheets—Sheet 1.
W. KIMMEL.
REAPER ATTACHMENT FOR TRACTION ENGINES.
No. 303,860. Patented Aug. 19, 1884.
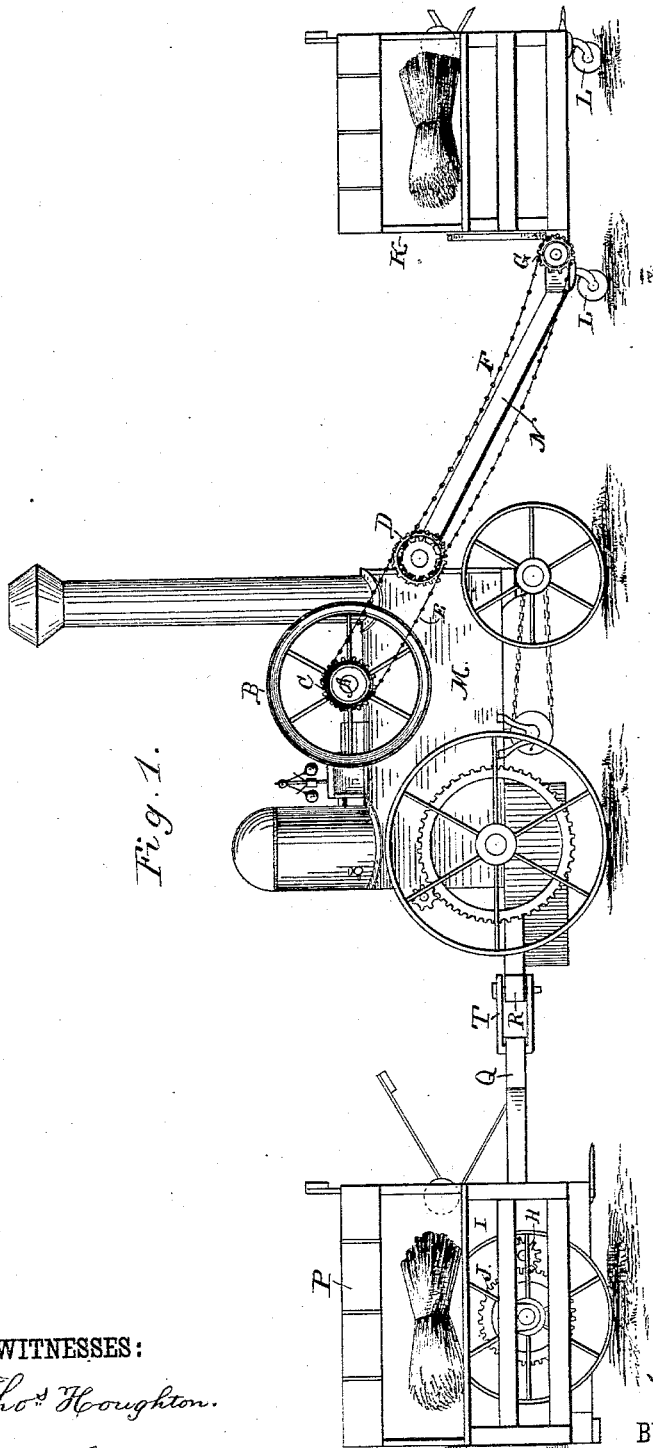
WITNESSES:
Thos Houghton.
W. X. Stevens.
INVENTOR:
Wm Kimmel
BY Munn
ATTORNEYS.

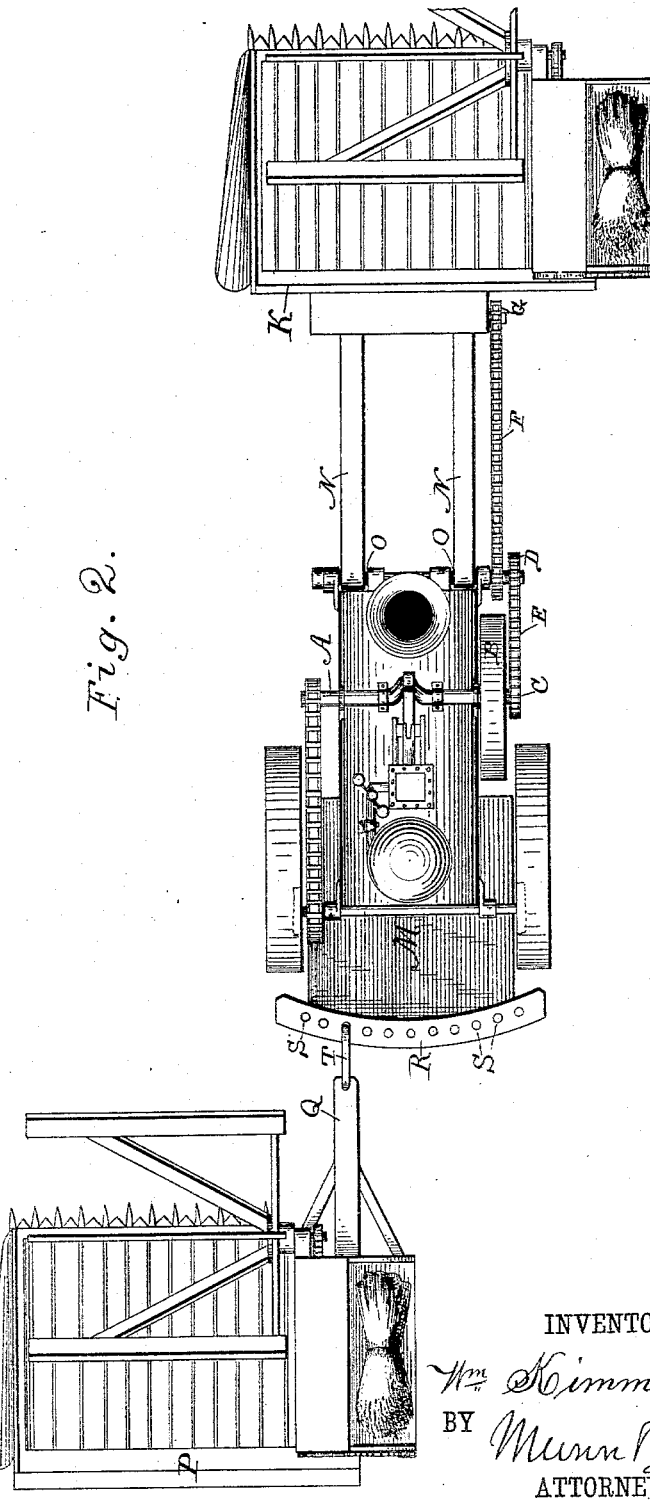

UNITED STATES PATENT OFFICE.

WILLIAM KIMMEL, OF CAMBRIDGE CITY, INDIANA.

REAPER ATTACHMENT FOR TRACTION-ENGINES.

SPECIFICATION forming part of Letters Patent No. 303,860, dated August 19, 1884.

Application filed August 21, 1883. (No model.)

*To all whom it may concern:*

Be it known that I, WILLIAM KIMMEL, a citizen of the United States, residing at Cambridge City, in the county of Wayne and State of Indiana, have invented a new and useful Improvement in Reaper Attachments for Traction-Engines, of which the following is a specification.

My invention relates to traction-engines which are used for different purposes and to reapers; and it has for its object to provide means whereby a traction-engine and one or more self-binding reapers are adapted to work together, the engine furnishing the power to work the reapers.

To this end my invention consists in certain attachments to a traction-engine and to reapers, hereinafter described and claimed, reference being had to the accompanying drawings, in which—

Figure 1 is a side elevation intended to represent a traction-engine drawing one harvester and pushing another in accordance with my invention, and Fig. 2 is a plan view of the same.

Upon the shaft A of the fly-wheel B of a traction-engine I place a sprocket-wheel, C, to drive an intermediate wheel, D, on a countershaft on the front end of the engine, by means of a chain, E. From the wheel D, or a mate to it on the same shaft, I run a chain, F, to a wheel, G, which takes the place of the usual pinion, H, as shown in the drawings, of the reaper P, which gears into the main drive-wheel I of a harvester, or into a spur-wheel, J, attached thereto. The office of this wheel G is to revolve the shaft which operates the sickle and other parts of the harvester just the same as the pinion H does, and as my invention has no reference to the subsequent results I do not show or describe further details with accuracy.

The frame of the harvester K may be the same in all respects as the frames of other harvesters—such as the Osborn self-binder—except that the main drive-wheel being dispensed with, it is not necessary to build up frame-work to carry the grain to the binder. The harvester K is mounted on three or more caster-wheels, L, to enable it to follow the guiding force of the engine M, to which it is connected by means of bars N, projecting rearward from the harvester. These bars are pivoted to the harvester at points nearly in line with the shaft of wheel G, and to the two sides of the forward end of the engine at O O, upon or very near to the shaft of the wheel D. The object of this is, first, that the engine and harvester may rise and fall relative to each other to accommodate themselves to the surface of the ground, and, second, that the relation between the wheel G and its driver D may not be materially changed by such rising and falling so as to loosen or tighten the chain belt F, for any considerable change of the due tension of this belt would prevent its proper action. When the engine is turned to the right or left, it swings the harvester K, causing it to move upon its casters bodily sidewise. The harvester K is intended to cut a swath from five to twelve feet wide directly ahead of the engine, clearing a path therefor, binding the grain cut, and dropping its bundles to one side of its path. The harvester P is in all respects like other harvesters adapted to be drawn by a team, except the pole Q, by which it is connected to the engine M. The common pole furnished with the reaper is detached, and the pole Q, which is much shorter, is fastened in the place thereof.

R is a hitch-beam secured across the rear end of the engine, extending out to one side thereof, and provided with a series of holes, S, and a clevis, T, to loosely connect the pole Q, so that the harvester P may follow the engine in its turnings, cutting to one side of the path thereof. By mean of this short tongue and the cross-bar R, provided with a series of holes, the harvester may, first, be kept close up to the engine, so as to turn short corners, and, secondly, it may be adapted to follow the engine in just the right path to give its sickle-bar a full reach into the standing grain, and not so far as to leave grain standing uncut between it and the engine. By means of my swinging bars N, connecting the forward harvester with the front end of the engine, and the caster-wheels L, I am able to clear a track for the engine by cutting the grain ahead of it, and by driving the machinery of the forward harvester by a chain receiving motion from the engine I dispense with the usual drive-wheel of the harvester. By this means I overcome the great difficulty met with in running a harvester ahead of an engine, growing out of the fact that a harvester drive-wheel cannot be made a caster, and therefore it could not be guided in the manner which I have described.

The cross-bar R may extend to both sides of the engine to draw either a right or left hand harvester.

What I claim as my invention, and wish to secure by Letters Patent, is—

1. The combination, with a road-engine having a counter-shaft journaled on its front end, and means by which it is actuated from the main shaft of the engine, of a harvesting-machine having two bars pivoted to its rear end and pivoted at their other ends to the engine, the axis of the pivot being concentric with the axis of said counter-shaft, a shaft journaled on said harvester, and connecting means, whereby it is driven by said counter-shaft, substantially as specified, whereby the harvester may be pushed along and its driven shaft remain in a fixed relation to the drive-wheel of the engine pushing it.

2. The combination, with an engine having a counter-shaft journaled on its front end, of a harvester having a shaft journaled thereon and driven by said counter-shaft, and a pair of bars secured at one end to the harvester and pivoted at the other end to the engine on a pivot coincident with the said counter-shaft, said harvester being supported wholly on caster-wheels, substantially as described, whereby said harvester may be moved bodily sidewise by the turning of the engine.

3. The harvester K, the bars N, secured thereto, the engine M, having said bars N pivoted to it, the shaft A, the fly-wheel B, and sprocket-wheel C, secured to said shaft, the intermediate counter-shaft journaled on the engine, and having the wheel D near the pivot of one of the bars N, the chain belt E, running on the wheels C and D, the wheel G on the harvester drive-shaft, and the chain F, communicating motion thereto from the intermediate wheel, D, as shown and described.

4. The engine M, having the beam R attached to its rear end and projecting to one side thereof, and provided with a series of holes, S, in combination with the harvester P, provided with a short tongue, Q, and a clevis, T, connecting said tongue with said beam R at some one of the holes S, as described.

WILLIAM KIMMEL.

Witnesses:
DANIEL KIMMEL,
W. A. STATZ.